United States Patent
Park et al.

(10) Patent No.: US 11,604,964 B2
(45) Date of Patent: Mar. 14, 2023

(54) RECOGNIZER, OBJECT RECOGNITION METHOD, LEARNING APPARATUS, AND LEARNING METHOD FOR DOMAIN ADAPTATION

(71) Applicant: SAMSUNG ELECTRONICS CO., LTD., Suwon-si (KR)

(72) Inventors: Seungin Park, Yongin-si (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 16/531,522

(22) Filed: Aug. 5, 2019

(65) Prior Publication Data

US 2020/0193269 A1 Jun. 18, 2020

(30) Foreign Application Priority Data

Dec. 18, 2018 (KR) .................... 10-2018-0163916

(51) Int. Cl.
   - *G06N 3/04* (2023.01)
   - *G06F 17/16* (2006.01)
   - *G06F 17/18* (2006.01)
   - *G06K 9/62* (2022.01)

(52) U.S. Cl.
   CPC .......... *G06N 3/0454* (2013.01); *G06F 17/16* (2013.01); *G06F 17/18* (2013.01); *G06K 9/6267* (2013.01); *G06N 3/0472* (2013.01)

(58) Field of Classification Search
   CPC .... G06N 3/0454; G06N 3/0472; G06N 3/088; G06F 17/16; G06F 17/18; G06K 9/6267; G06K 9/6257; G06K 9/6282; G06V 10/764; G06V 10/776; G06V 10/82; G06V 10/443
   See application file for complete search history.

(56) References Cited

U.S. PATENT DOCUMENTS

| | | | |
|---|---|---|---|
| 2017/0200265 A1 | 7/2017 | Bhaskar et al. | |
| 2017/0220897 A1 | 8/2017 | Chidlovskii et al. | |
| 2017/0365038 A1 | 12/2017 | Denton et al. | |
| 2019/0180136 A1* | 6/2019 | Bousmalis | G06N 3/084 |
| 2020/0097554 A1* | 3/2020 | Rezagholizadeh | G06N 3/0472 |

(Continued)

FOREIGN PATENT DOCUMENTS

| | | |
|---|---|---|
| JP | 2018-92377 A | 6/2018 |
| JP | 2019-8742 A | 1/2019 |
| KR | 10-2016-0058825 A | 5/2016 |

OTHER PUBLICATIONS

Tang et al., Improving Multilingual Semantic Textual Similarity with Shared Sentence Encoder for Low-resource Languages, Oct. 2018 (Year: 2018).*

(Continued)

*Primary Examiner* — Mohammad K Islam
(74) *Attorney, Agent, or Firm* — NSIP Law

(57) ABSTRACT

A recognizer including a shared encoder to extract a feature of an input image in a source domain and a target domain; and a shared decoder to classify a class of an object included in the input image based on the feature of the input image, in the source domain and the target domain. A set of object classes of the source domain and a set of object classes of the target domain differ from each other.

7 Claims, 6 Drawing Sheets

(56) References Cited

U.S. PATENT DOCUMENTS

2020/0342643 A1* 10/2020 Gouws .................. G06T 11/60
2021/0216818 A1* 7/2021 Umeda .................. G06N 3/08

OTHER PUBLICATIONS

Valindria et al. (Multi-Modal Learning from Unpaired Images: Application to Multi-Organ Segmentation in CT and MRI, IEEE, 2018) (Year: 2018).*
Niehues et al. (Exploiting Linguistic Resources for Neural Machine Translation Using Multi-task Learning, 2017) (Year: 2017).*
Mehdi Mirza, "Conditional Generative Adversarial Nets", Nov. 2014, pp. 1-7.
Eric Tzeng, et al., "Deep Domain Confusion: Maximizing for Domain Invariance", Dec. 2014, pp. 1-9.
Tim Salimans, et al., "Improved Techniques for Training GANs", Jun. 2016, pp. 1-10.
Eric Tzeng, et al., "Adversarial Discriminative Domain Adaptation", *Computer Vision Foundation*, pp. 7167-7176.
Feiwu Yu, et al., "Exploiting Images for Video Recognition with Hierarchical Generative Adversarial Networks", Proceedings of the Twenty-Seventh International Joint Conference on Artificial Intelligence, pp. 1107-1113.
Riccardo Volpi, et al., "Adversarial Feature Augmentation for Unsupervised Domain Adaptation", *Computer Vision Foundation*, pp. 5495-5504.
Ian J. Goodfellow, et al., "Generative Adversarial Nets", pp. 1-9.
Arthur Gretton, et al., "Covariate Shift by Kernel Mean Matching", *Covariate Shift by Kernel Mean Matching*, pp. 1-38.

* cited by examiner

200

RECOGNIZER, OBJECT RECOGNITION METHOD, LEARNING APPARATUS, AND LEARNING METHOD FOR DOMAIN ADAPTATION

CROSS-REFERENCE TO RELATED APPLICATIONS

This application claims the benefit under 35 USC § 119(a) of Korean Patent Application No. 10-2018-0163916 filed on Dec. 18, 2018 in the Korean Intellectual Property Office, the entire disclosure of which is incorporated herein by reference for all purposes.

BACKGROUND

1. Field

The following description relates to a recognizer, an object recognition method, a learning apparatus, and a learning method for domain adaptation.

2. Description of Related Art

Deep neural networks (DNNs), when they are applied outside a domain, for example, a source domain, of data used for training, do not work universally and exhibit degraded performance in terms of accuracy.

If a labelled data set for retraining a DNN in a new domain needs to be secured every time it applies to the new domain, for example, a target domain, to achieve the performance, it may cause a high cost issue. In addition, it is difficult to collect a sufficient labelled data set for retraining in the new domain.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a recognizer of which a domain is transformed from a source domain to a target domain includes a shared encoder configured to extract a feature of an input image in the source domain and the target domain; and a shared decoder configured to classify a class of an object included in the input image based on the feature of the input image, in the source domain and the target domain. A set of object classes of the source domain and a set of object classes of the target domain differ from each other.

A first portion of the object classes of the target domain may overlap the object classes of the source domain, and a second portion of the object classes of the target domain may not overlap the object classes of the source domain.

The shared encoder may include a first common parameter for extracting the feature of the input image in the source domain and the target domain.

The shared decoder may include a second common parameter for classifying a class of the object based on the feature of the input image, in the source domain and the target domain.

In another general aspect, a learning apparatus for domain adaptation includes an encoder configured to extract a feature of an input image; a first discriminator configured to estimate a first probability of whether the input image is a real image or a fake image based on the feature of the input image; a second discriminator configured to estimate a second probability of whether the input image is the real image or the fake image based on the feature of the input image and a label corresponding to the input image; and a controller configured to calculate a first loss based on the first probability, to calculate a second loss based on the second probability, and to train the encoder based on the first loss and the second loss.

The controller may be configured to train the encoder based on the first loss in response to absence of the label corresponding to the input image.

The learning apparatus may further include a generator configured to generate the fake image based on a combination of a random vector and a random label.

The real image may include one of an input image of a source domain and an input image of a target domain, and the fake image may include an image that is generated based on a combination of a random vector and a random label.

In another general aspect, a learning apparatus for domain adaptation includes an encoder configured to extract a feature of an input image; and a controller configured to classify a label corresponding to the input image as a first label in response to presence of the label corresponding to the input image based on the feature of the input image, to estimate a probability of a second label indicating whether the input image is a real image or a fake image in response to absence of the label corresponding to the input image, to calculate a third loss based on the probability, and to train the encoder based on the third loss.

The label may include the first label corresponding to the input image and the second label indicating whether the input image is the real image or the fake image.

In another general aspect, a method of recognizing an object of which a domain is transformed from a source domain to a target domain includes extracting a feature of an input image in the source domain and the target domain; classifying a class of an object included in the input image based on the feature of the input image, in the source domain and the target domain; and outputting the class of the object. A set of object classes of the source domain and a set of object classes of the target domain differ from each other.

A first portion of the object classes of the target domain may overlap the object classes of the source domain, and a second portion of the object classes of the target domain may not overlap the object classes of the source domain.

The extracting may include extracting the feature of the input image using a first common parameter that is common in the source domain and the target domain.

The classifying of the class of the object may include classifying the class of the object included in the input image using a second common parameter that is common in the source domain and the target domain.

In another general aspect, a learning method for domain adaptation includes extracting a feature of an input image; estimating a first probability of whether the input image is a real image or a fake image based on the feature of the input image; estimating a second probability of whether the input image is the real image or the fake image based on the feature of the input image and a label corresponding to the input image; calculating a first loss based on the first probability and calculating a second loss based on the second probability; and training an encoder configured to extract the feature of the input image based on the first loss and the second loss.

The learning method may further include determining whether the label corresponding to the input image is present.

The training of the encoder may include training the encoder based on the first loss in response to the label corresponding to the input image being determined to be absent.

The learning method may further include generating the fake image based on a combination of a random vector and a random label.

The real image may include one of an input image of a source domain and an input image of a target domain, and the fake image may include an image that is generated based on a combination of a random vector and a random label.

In another general aspect, an apparatus includes a memory configured to store one or more programs; and one or more processors configured to execute the one or more programs to: generate a fake image, extract a feature of an input image, calculate a first loss pertaining to whether the input image is a real image or the fake image based on the feature of the input image, calculate a second loss pertaining to whether the input image is the real image or the fake image based on the feature of the input image and a label corresponding to the input image, and minimize a sum of the first loss and the second loss.

Other features and aspects will be apparent from the following detailed description, the drawings, and the claims.

Figure 1:
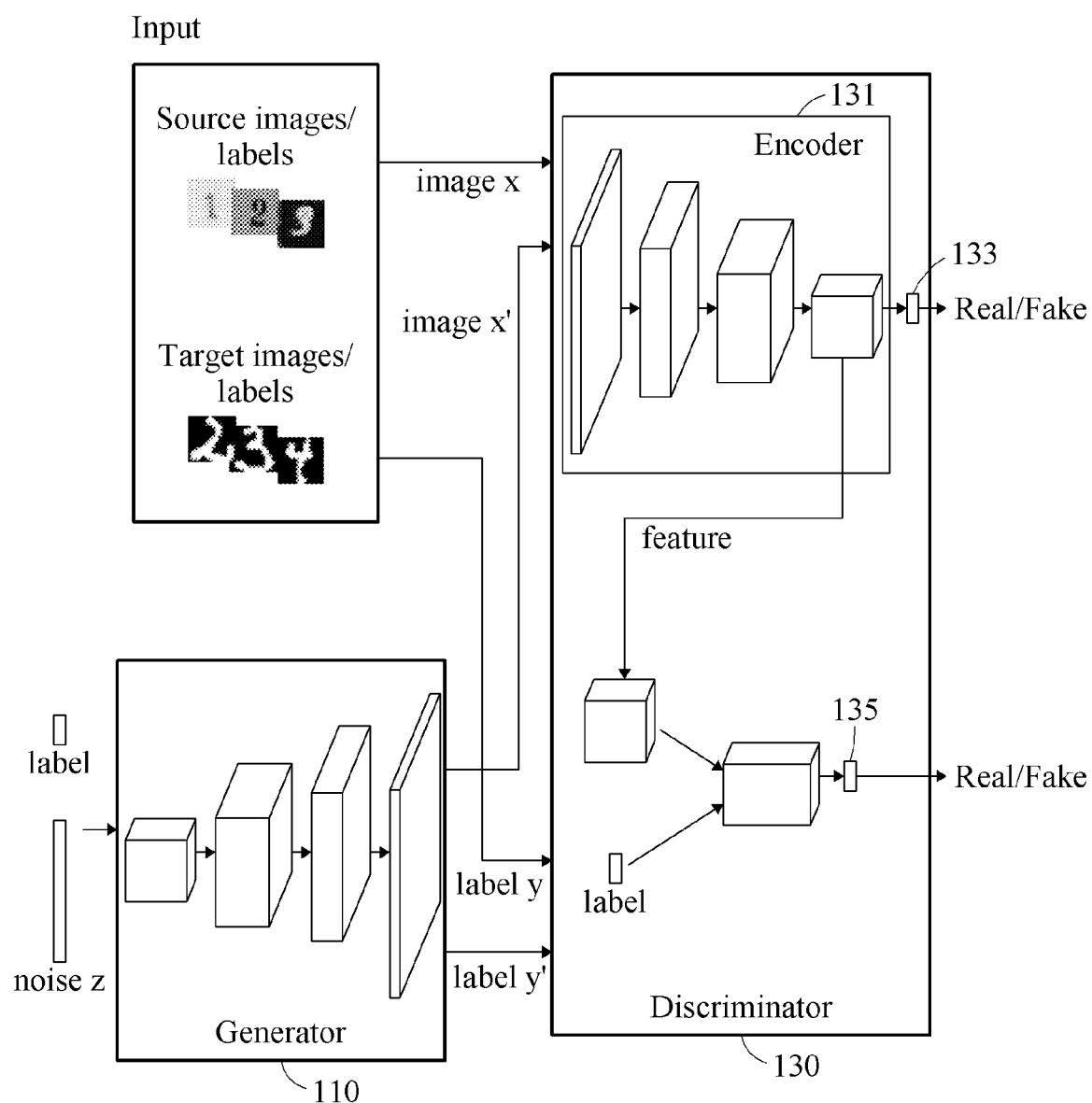
FIG. 1 illustrates an example of a structure of a neural network configured to acquire a shared encoder commonly operating in a source domain and a target domain.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various varies and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

The following examples may apply to recognizing or displaying a line, a vehicle, and/or a pedestrian and to generating visual information for assisting steering of an autonomous driving vehicle in an augmented reality (AR) system of a smart vehicle, etc. Also, the examples may be used to assist safe and pleasant driving by interpreting visual information in a device including a smart system, such as a head-up display (HUD) installed for driving assistance or complete auto driving in a vehicle. For example, the examples may be applied to an autonomous driving vehicle, a smart vehicle, a smartphone, and a mobile device. Hereinafter, the examples are described with reference to the accompanying drawings. Like reference numerals used herein may refer to like elements throughout.

FIG. 1 illustrates an example of a structure of a neural network configured to acquire a shared encoder commonly operating in a source domain and a target domain.

Many domain adaptation (DA) technologies assume a closed-set environment in which classes of a source domain and classes of a target domain completely match. However, the assumption is barely present in a real environment. Here, the source domain may be understood as a domain in which all of labels corresponding to source data or a source image are present, that is, a domain that includes labels a current neural network is trained to estimate. Also, the target domain may be understood as a domain in which only a portion of labels corresponding to target data or a target image are present, that is, a domain that includes labels the current neural network is trained to estimate.

For example, with the assumption that a road sign board recognizer trained using annotated data or labeled data for the source domain, for example, country A, is used in the target domain, for example, country B, unique road sign boards may be present for each country in addition to road signs that are commonly present in the country A and the country B. A case in which an object class of the source domain and an object class of the target do not perfectly match may be an open-set issue. Current DA technologies do not solve the open-set issue.

An encoder (Es) and a classifier (Cs) configured to extract a feature with respect to data of the source domain may be trained using data of the source domain. A feature encoder (Et) and a domain discriminator may be trained by using the encoder (Es) as a reference feature encoder and minimizing an adversarial loss. The feature encoder (Et) may generate an invariable domain feature for data of the source domain and data of the target domain.

During an interference process, classification may be performed by substituting the classifier (Cs) with a feature acquired by applying the feature encoder (Et) to a target image. The feature encoder (Et) generates a feature indicating a distribution similar to a source feature with respect to target data and thus, is the classifier (Cs) trained with respect to data of a source domain and also used as the classifier (Cs) with respect to data of a target domain.

For example, when the feature encoder (Et) configured to extract data of the target domain is trained based on the encoder (Es) configured to extract a feature with respect to data of the source domain, the feature encoder (Et) does not extract a feature including discriminative information used to discriminate data that belongs to a new class of the target domain. Therefore, it is difficult to guarantee that the feature extracted by the feature encoder (Et) is excellent for data classification of the target domain. The classifier (Cs) pretrained using source data may not readily classify data that belongs to the new class of the target domain.

In one example, the aforementioned open-set issue may be outperformed by training a shared encoder that commonly operates in a source domain and a target domain through a deep neural network (DNN)-based domain adaptation, and a shared classifier that commonly operates in the source domain and the target domain based on the shared encoder, instead of training an encoder configured to extract a feature in each of the source domain and the target domain.

Hereinafter, a semi-supervision learning environment in which an image data set that includes labels corresponding to all of the images is present in the source domain and an image data set that includes only labels corresponding to a portion of the images is present in the target domain is assumed.

FIG. 1 illustrates a neural network 100 that includes a generator 110 and a discriminator 130. The neural network 100 may be, for example, a conditional generative adversarial network (GAN).

In general, a generative adversarial network (GAN) may include two neural networks, for example, a generative model and a discriminative model. The discriminative model aims to distinguish a real sample of training data from a fake sample generated by the generative model. Also, to deceive the discriminative model, the generative model aims to generate a fake sample of a very similar level to the training data. The GAN may train both the discriminative model and the generative model in order to enhance the discrimination ability of the discriminative model and to assist the generative model to deceive the discriminative model. Through such training, the generative model may generate a fake sample of a level indistinguishable between real and fake and the discriminative model may achieve the enhanced discrimination ability.

In one example, based on the aforementioned basic operation of the GAN model, further importance is placed on training of the discriminative model as an encoder configured to extract a feature and the generative model serves to provide additional data to train the discriminative model. For example, the conditional GAN that further accurately simulates a data distribution for each class of training data may be used.

The generator 110 generates a fake image, for example, image x', based on a combination of a random vector and a random label. The random vector may be, for example, a noise vector z, and may be a random code or a latent code. The random label may indicate a class of the fake image (image x'). All of the classes that are present in the source domain and the target domain may be included in the random label. A general loss or a feature matching loss may be used as a loss function of the generator 110.

For example, when the random label indicates a pedestrian class, a fake image generated by the generator 110 may be a fake image of a pedestrian. Also, when the random label indicates a number class, a fake image generated by the generator 110 may be a fake image of a number. The generator 110 may train a data distribution for each label (label y) corresponding to each of images of the source domain and the target domain.

In one example, the discriminator 130 aims to learn a feature representation representing a feature of given data. Accordingly, importance is placed on training the discriminator 130 to learn a feature distribution of actual training data rather than to make the generator 110 generate a fake image similar to a real image. When the generator 110 generates an image from which a feature closer, for example, more similar to real data is acquirable, a feature extraction ability of the discriminator 130 may be enhanced. Accordingly, the generator 110 may be trained using the feature matching loss rather than a loss of maximizing a loss of the discriminator 130.

In one example, the discriminator 130 may perform two discrimination tasks including a first task and a second task. Similar to the aforementioned basic GAN, the first task is to distinguish, that is, determine training data and an image generated by the generator 110 as a real image or a fake image based on unlabeled images of the source domain and the target domain. Since the first task corresponds to an unsupervised learning not using a label, the discriminator 130 may learn a further general feature representation using all of given images, for example, data.

The second task is to distinguish, that is, determine a pair of combination (feature, y) that includes a feature extracted from a penultimate layer before distinguishing the real image from the fake image in the first task and the label as true or fake. In the second task, the discrimination task may be performed only on data that includes label information. Therefore, the second task may correspond to supervised learning.

The discriminator 130 is trained to minimize a sum of a first loss based on the first task and a second loss based on the second task. The discriminator 130 is trained to extract a general feature based on the overall given data through the first task, and, at the same time, to include information on a unique data distribution of each class in a corresponding feature representation through the second task.

In one example, since two discrimination tasks including the first task and the second task are performed in the discriminator 130, it is possible to prevent the neural network from overfitting due to training limited to labelled data in an environment in which only labels of partial data of the target domain are present.

In one example, the discriminator 130 may learn a feature representation about the entire input image by performing two discrimination tasks and may successfully classify a corresponding feature although a label corresponding to an input image is absent.

The discriminator 130 includes an encoder 131, a first discriminator 133, and a second discriminator 135.

Referring to FIG. 1, a real image (image x) or a fake image (image x') is input to the discriminator 130. The real image (image x) includes one of an input image of the source domain and an input image of the target domain. Also, the fake image (image x') includes an image generated by the generator 110 based on a combination of a random vector and a random label.

As described above, unsupervised learning and supervised learning are performed in the discriminator 130, an image of the source domain, an image of the target domain, and label data corresponding to each image may be input to the discriminator 130.

For example, the real image (image x) of the source domain or the target domain and the fake image (image x') generated by the generator 110 may be alternately input to the discriminator 130. Here, label data corresponding to an image that is input to the discriminator 130 may be input in the same order as that of the image.

The encoder 131 extracts a feature of the input image that is input to the discriminator 130. For example, the encoder 131 may be configured using a DNN including a plurality of layers. The encoder 131 is trained to extract a feature for discriminating the real image of the source domain or the target domain from the fake image generated by the generator 110, for each class. The encoder 131 is trained to learn a further general feature representation using all of the input data. The source domain and the target domain may include a first common parameter for extracting the feature of the input image.

The first discriminator 133 performs the first task of distinguishing, that is, determining the input image input to the discriminator 130 as the real image or the fake image. The first discriminator 133 estimates a first probability indicating whether the input image is the real image or the fake image based on the feature of the input image extracted by the encoder 131. Here, the feature of the input image may be extracted from, for example, a penultimate layer among the plurality of layers of the encoder 131. For example, the first discriminator 133 may output '1' for the real image and may output '0' for the fake image.

The second discriminator 135 performs the second task of distinguishing, that is, determining a combination of the input image input to the discriminator 130 and a label corresponding to the input image as true or false. For example, when the real image is input, the second discriminator 135 may determine whether the real image and a real label (label y) corresponding thereto are accurately combined or whether the real image and a fake label (label y') of the fake image are erroneously combined. That is, the second discriminator 135 estimates a second probability indicating whether the input image is the real image or the fake image based on the feature of the input image extracted by the encoder 131 and the label corresponding to the input image. For example, when the input image is the image of the source domain, labels corresponding to all of the input images are present and a combination between the input image and the label is possible. However, when the input is the image of the target image, a label corresponding to the input image may be present or may be absent. For example, in the case of the image of the target domain in which the label corresponding to the input image is absent, an operation of the second discriminator 135 may be performed.

For example, when the label corresponding to the input image is present, the discriminator 130, for example, a controller (not shown) of the discriminator 130 calculates a first loss based on the first probability estimated by the first discriminator 133 and calculates a second loss based on the second probability estimated by the second discriminator 135.

The controller of the discriminator 130 trains the encoder 131 based on the first loss and the second loss, and trains the encoder 131 to minimize a sum of the first loss and the second loss, that is, such that a sum of the first loss and the second loss may be less than a preset reference.

For example, when the label corresponding to the input image is absent, the controller of the discriminator 130 may train the encoder 131 based on the first loss.

In one example, the encoder 131 that is included in the discriminator 130 may operate as a shared encoder that commonly operates in the source domain and the target domain.

Figure 2:
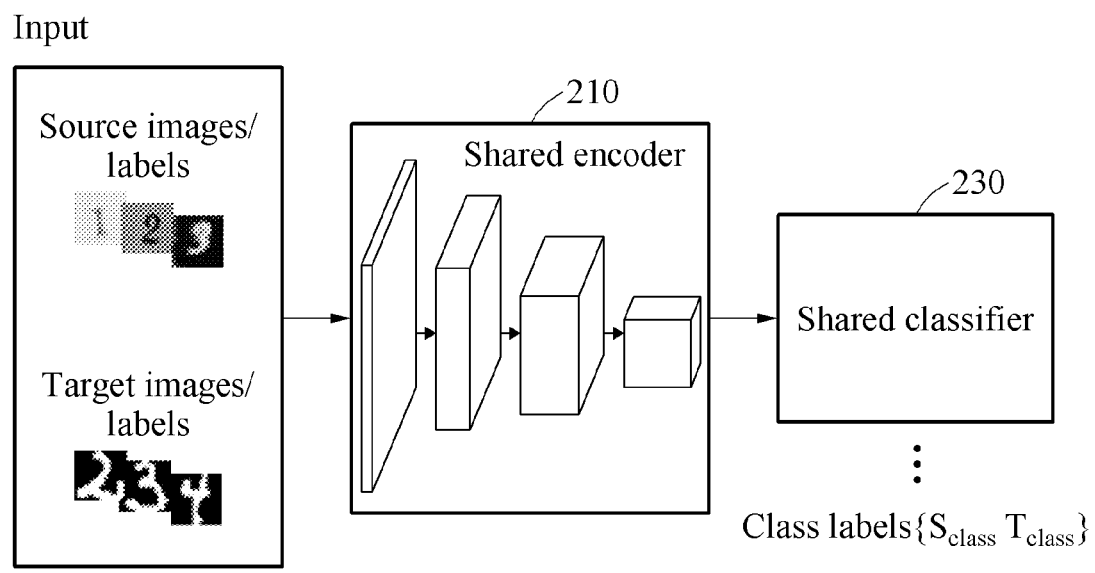
FIG. 2 illustrates an example of a structure of a neural network configured to train a shared decoder using a shared encoder.

FIG. 2 illustrates an example of a structure of a neural network configured to train a shared decoder using a shared encoder. FIG. 2 illustrates a neural network 200 that includes a shared encoder 210 and a shared decoder 230. The shared decoder 230 is also referred to as a shared classifier.

The shared encoder 210 may be trained through adversarial training of the aforementioned conditional GAN-based generator and the discriminator. Also, the shared decoder 230 may be trained using labeled data of a source domain and a target domain based on the shared encoder 210.

An input image and label data of each of the source domain and the target domain may be input to the shared encoder 210. The shared encoder 210 extracts a feature of the input image in each of the source domain and the target domain.

The shared decoder 230 classifies a class of an object included in the input image based on the feature of the input image extracted by the shared encoder 210. The shared decoder 230 may further include additional layers for classification based on the shared encoder 210 and a weight (or a first common parameter) acquired through training of the discriminator of FIG. 1. The shared decoder 230 may be confirmed through a tuning process using labelled data. Here, the additional layers may include a second common parameter for classifying the class of the object based on the feature of the input image extracted by the shared encoder 210, in the source domain and the target domain.

For example, label data used by the shared decoder 230 may include a union of object classes of the source domain and object classes of the target domain. A set of the object classes of the source domain and a set of the object classes of the target domain may differ from each other.

Figure 3:
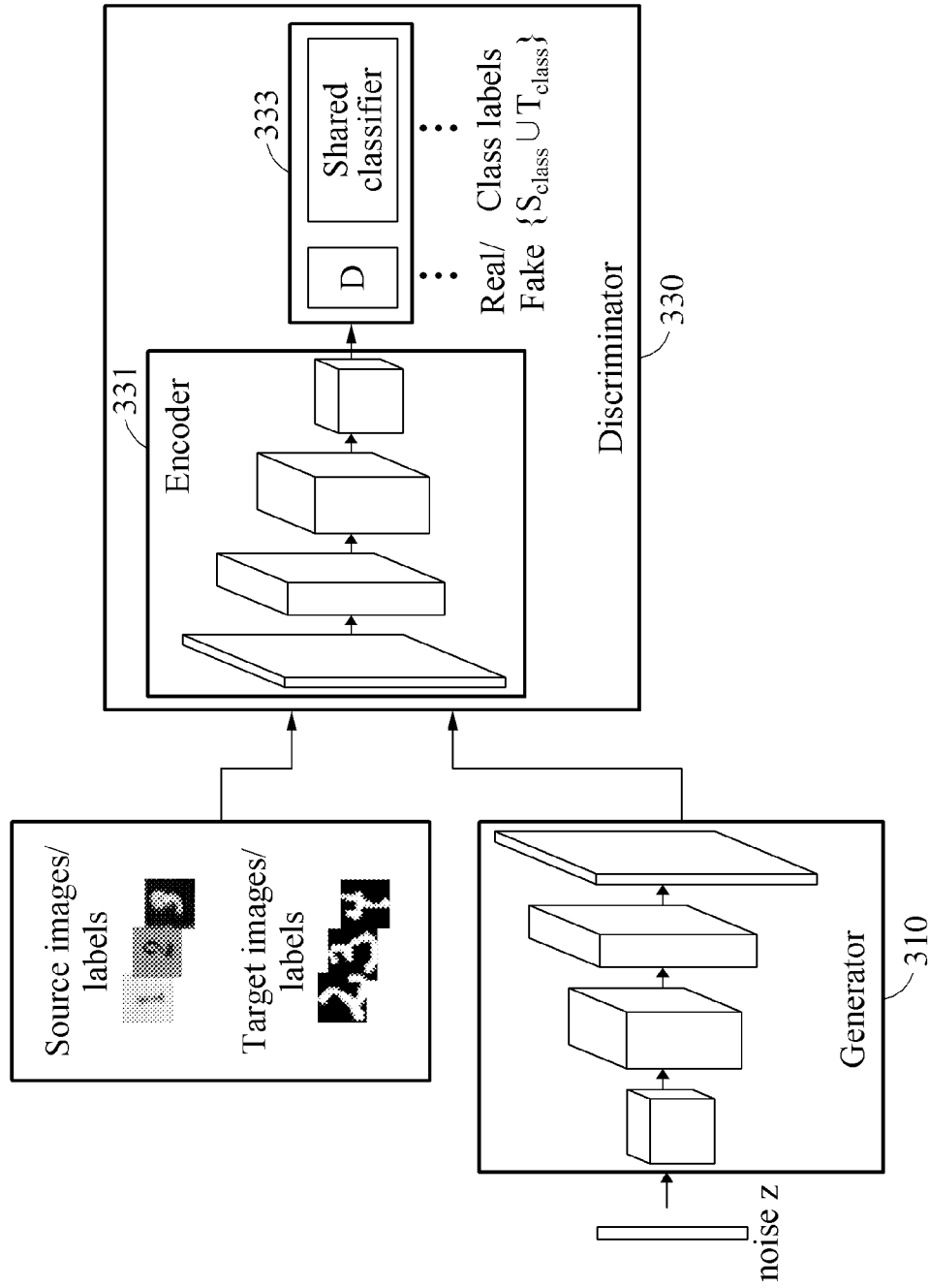
FIG. 3 illustrates an example of a structure of a neural network configured to acquire a shared encoder.

FIG. 3 illustrates an example of a structure of a neural network configured to acquire a shared encoder. FIG. 3 illustrates a neural network 300 that includes a generator 310 and a discriminator 330.

The generator 310 generates a fake image based on a combination of a random vector and a random label. For example, the generator 310 generates the fake image by receiving and transforming a noise vector z. The generator 310 may operate in the aforementioned basic GAN structure.

The discriminator 330 receives an input image of each of the source domain and the target domain. As described above, since supervised learning and unsupervised learning are performed inside the discriminator 330, all of the input image of each of the source domain and the target domain and label data corresponding thereto may be input to the discriminator 330.

The discriminator 330 determines whether the input image is a real image or a fake image and, at the same time, serves as a shared decoder. For example, a total of K classes may be present in the source domain and the target domain. In one example, by adding a single label indicating whether the input image is the real image or the fake image, the discriminator 330 may function as a multiclass classifier configured to perform classification, for example, decoding on (K+1) classes.

The discriminator 330 includes an encoder 331 and a controller 333. The controller 333 includes a discriminator (D) and a shared decoder (also, referred to as a shared classifier).

The encoder 331 extracts a feature of the input image. The controller 333 determines whether a label corresponding to the input image is present based on the feature of the input image extracted by the encoder 331. When the label corresponding to the input image is determined to be present, the controller 333 classifies the label corresponding to the input image as a first label. When the first label is determined to be absent, the controller 333 estimates a probability of a second label indicating whether the input image is a real image or a fake image. Here, the label may include, for example, the first label corresponding to the input image and the second label indicating whether the input image is the real image or the fake image. The controller 333 calculates a third loss based on the estimated probability and trains the encoder 331 based on the third loss. The third loss may be calculated as a sum of an unsupervised loss and a classification loss regarding whether the input image is the real image or the fake image, and used to train the encoder 331. In one example, since the discriminator and the shared decoder (shared classifier) are simultaneously trained, it is possible to reduce an amount of time used for training.

Figure 4:
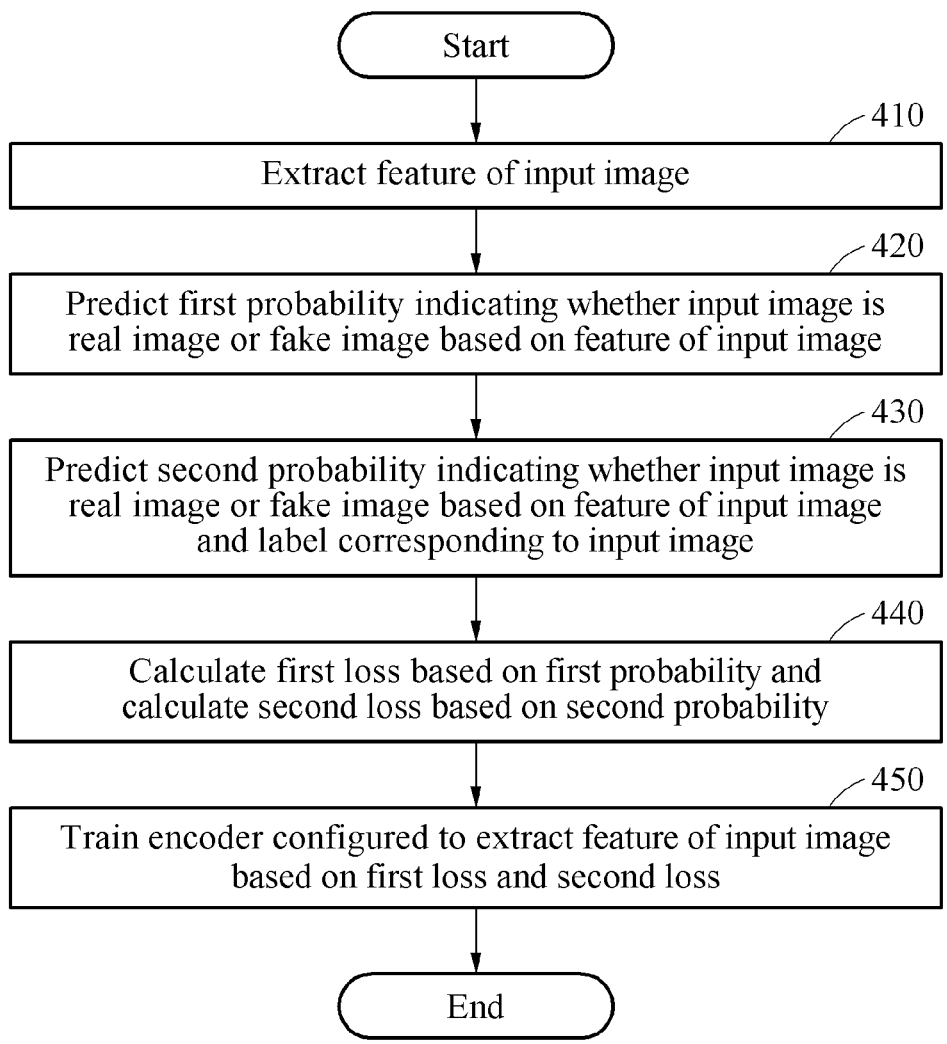
FIG. 4 is a flowchart illustrating an example of a learning method for domain adaptation.

FIG. 4 is a flowchart illustrating an example of a learning method for domain adaptation. Referring to FIG. 4, in operation 410, a learning apparatus for domain adaptation (hereinafter, a learning apparatus) extracts a feature of an input image.

In operation 420, the learning apparatus estimates a first probability indicating whether the input image is a real image or a fake image based on the feature of the input image extracted in operation 410.

In operation 430, the learning apparatus estimates a second probability indicating whether the input image is the real image or the fake image based on the feature of the input image extracted in operation 410 and a label corresponding to the input image. Here, the real image may include one of an input image of a source domain and an input image of a target domain. Also, the fake image may include an image that is generated based on a combination of a random vector and a random label.

In operation 440, the learning apparatus calculates a first loss based on the first probability and calculates a second loss based on the second probability.

In operation 450, the learning apparatus trains the encoder configured to extract feature of the input image based on the first loss and the second loss. The learning apparatus may determine whether the label corresponding to the input image is present. For example, when the label corresponding to the input image is determined to be present, the learning apparatus may train the encoder based on the first loss and the second loss. When the label corresponding to the input image is determined to be absent, the learning apparatus may train the encoder based on the first loss.

Figure 5:
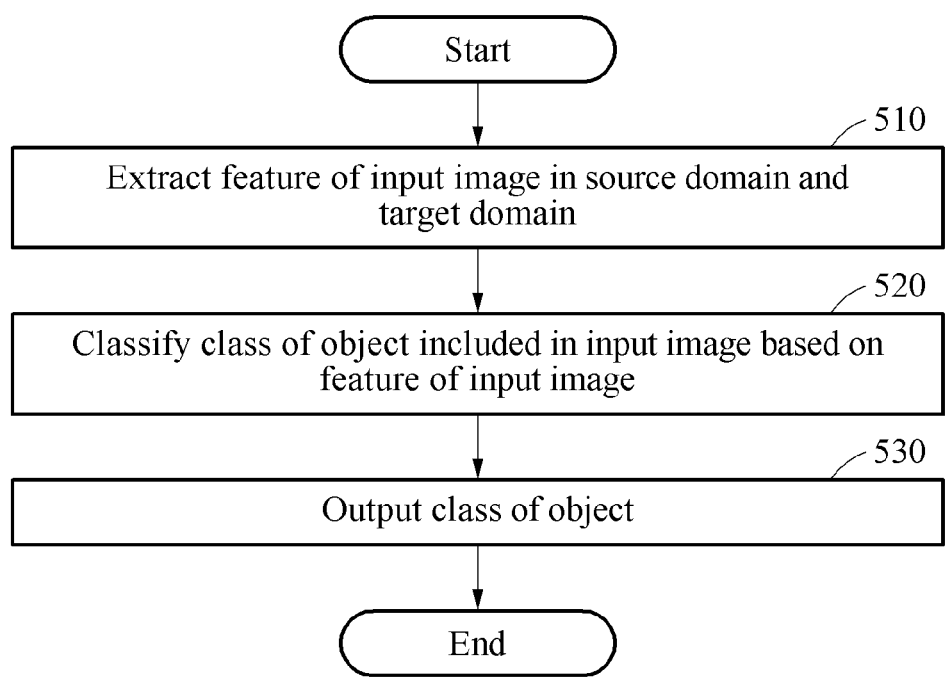
FIG. 5 is a flowchart illustrating an example of an object recognition method.

FIG. 5 is a flowchart illustrating an example of an object recognition method. Referring to FIG. 5, in operation 510, a recognizer extracts a feature of an input image in a source domain and a target domain. The recognizer may extract the feature of the input image using a first common parameter that is common in the source domain and the target domain.

In operation 520, the recognizer classifies a class of an object included in the input image based on the feature of the input image extracted in operation 510. Here, a set of object classes of the source domain and a set of object classes of the target domain differ from each other. That is, a portion of the object classes of the target domain may overlap the object classes of the source domain, and a remaining portion of the object classes of the target domain may not overlap the object classes of the source domain. The recognizer may classify the class of the object included in the input image using a second common parameter that is common in the source domain and the target domain.

In operation 530, the recognizer outputs the class of the object.

Figure 6:
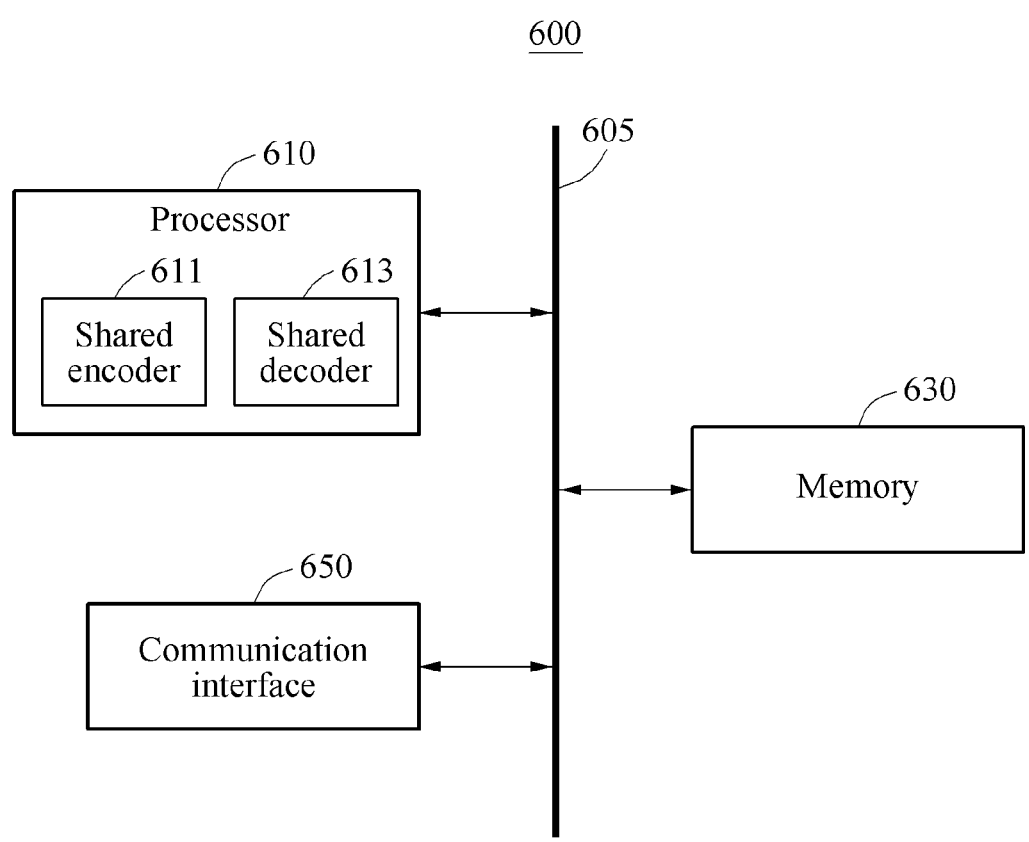
FIG. 6 illustrates an example of a recognizer.

FIG. 6 illustrates an example of a recognizer. Referring to FIG. 6, a recognizer 600 includes a processor 610, a memory 630, and a communication interface 650. The processor 610, the memory 630, and the communication interface 650 may communicate with each other through a communication bus 605.

The processor 610 includes a shared encoder 611 and a shared decoder 613.

The shared encoder 611 extracts a feature of an input image in a source domain and a target domain. The shared encoder 611 includes a first common parameter for extracting the feature, in the source domain and the target domain.

The shared decoder 613 classifies a class of an object included in the input image based on the feature of the input image extracted by the shared encoder 611, in the source domain and the target domain. The shared decoder 613 may include a second common parameter for classifying the class of the object based on the extracted feature of the input image, in the source domain and the target domain.

Here, a set of object classes of the source domain and a set of object classes of the target domain differ from each other. For example, a portion of the object classes of the target domain may overlap the object classes of the source domain, and a remaining portion of the object classes of the target domain may not overlap the object classes of the source domain.

The processor 610 may recognize the object included in the input image using the shared encoder 611 and the shared decoder 613 that are trained through the learning method described above with reference to FIGS. 1 to 3. In addition, the processor 610 may perform at least one method described above with reference to FIGS. 1 to 5 and an algorithm corresponding thereto. The processor 610 executes a program and controls the recognizer 600. A code of the program executed by the processor 610 is stored in the memory 630.

The memory 630 stores a set of object classes of the source domain and a set of object classes of the target domain. The memory 630 may store an object recognized by the processor 610 based on the input image.

The memory 630 may store parameters of a neural network that is trained to extract the feature of the input image and to classify the class of the object included in the input image based on the extracted feature. The processor 610 may classify and/or recognize the object included in the input image using the neural network to which the parameters stored in the memory 630 are applied. For example, the neural network may be a DNN including a plurality of layers.

The memory 630 may store a variety of information generated during the aforementioned processing process of the processor 610. In addition, the memory 630 may store a variety of data and programs. The memory 630 may include a volatile memory or a non-volatile memory. The memory 630 may store a variety of data by including a mass storage medium such as a hard disc.

The communication interface 650 receives the input image. Also, the communication interface 650 outputs or transmits information on the object recognized by the processor 610.

The apparatuses and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
a shared encoder configured to receive an input image and extract a feature of the input image, wherein the image has a class that is in a source domain and is in a target domain; and
a shared discriminator configured to determine a class of the input image based on the feature of the input image, wherein the determined class is in the source domain and the target domain,
wherein the source and target domain have some classes in common and wherein each domain has some classes that are not in the other domain.

2. The electronic device of claim 1, wherein the shared encoder comprises a first common parameter configured to extract the feature of the input image from images in the source domain and from images in the target domain.

3. The electronic device of claim 2, wherein the shared decoder comprises a second common parameter for classifying the class of the input image based on the feature of the input image.

4. A method performed by a computing device, the method comprising:
extracting, by a shared encoder, a feature of an input image received by the shared encoder, wherein the input image has a class that is in a source domain and is in a target domain;
classifying, by a shared discriminator, a class of the input image based on the feature of the input image, wherein the determined class is in the source domain and is in the target domain; and
outputting an indication of the class of the object,
wherein the source domain and the target domain have some classes in common and wherein each domain has some classes that are not in the other domain.

5. The method of claim 4, wherein the extracting comprises extracting the feature of the input image using a first common parameter of the encoder that is configured to extract the feature from images in the source domain and from images in the target domain.

6. The method of claim 5, wherein the classifying comprises classifying an object included in the input image using a second common parameter that is common in the source domain and the target domain.

7. A non-transitory computer-readable medium storage medium storing instructions that, when executed by a computer, cause the processor to perform the method of claim 4.

* * * * *